(12) United States Patent
Chang et al.

(10) Patent No.: US 8,319,610 B2
(45) Date of Patent: Nov. 27, 2012

(54) RADIO-FREQUENCY IDENTIFICATION (RFID) ANTENNA, TAGS AND COMMUNICATIONS SYSTEMS USING THE SAME

(75) Inventors: Li-Chi Chang, Taichung (TW); Meng Sheng Chen, Kaohsiung County (TW); Kuo-Chiang Chin, Taipei County (TW); Chang-Sheng Chen, Taipei (TW); Cheng-Hua Tsai, Taipei County (TW); Wei-Ting Chen, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 658 days.

(21) Appl. No.: 12/535,628

(22) Filed: Aug. 4, 2009

(65) Prior Publication Data

US 2010/0039232 A1    Feb. 18, 2010

Related U.S. Application Data

(60) Provisional application No. 61/088,083, filed on Aug. 12, 2008.

(30) Foreign Application Priority Data

Dec. 11, 2008  (TW) ................ 97148160 A

(51) Int. Cl.
*H04Q 5/22* (2006.01)
(52) U.S. Cl. ..................................... 340/10.1
(58) Field of Classification Search ............. 340/10.1, 340/505, 539.1, 572.2, 572.5, 572.7; 347/700
See application file for complete search history.

(56) References Cited

U.S. PATENT DOCUMENTS

| | | | |
|---|---|---|---|
| 4,864,320 A * | 9/1989 | Munson et al. | 343/833 |
| 6,097,347 A | 8/2000 | Duan et al. | |
| 6,259,408 B1 * | 7/2001 | Brady et al. | 343/700 MS |
| 6,512,488 B2 * | 1/2003 | Schantz | 343/795 |
| 6,999,028 B2 | 2/2006 | Egbert | |
| 7,042,413 B2 | 5/2006 | Mazoki et al. | |
| 7,055,754 B2 | 6/2006 | Forster | |
| 7,154,449 B2 | 12/2006 | Liu et al. | |
| 7,183,994 B2 | 2/2007 | Weigand | |
| 7,190,319 B2 | 3/2007 | Forster et al. | |
| 7,262,701 B1 | 8/2007 | Nguyen | |
| 7,277,017 B2 | 10/2007 | Baba et al. | |
| 7,538,738 B2 * | 5/2009 | Kai et al. | 343/795 |

(Continued)

FOREIGN PATENT DOCUMENTS

CN    101053115AA    10/2007

OTHER PUBLICATIONS

Taiwan Patent Office, Office Action, Patent Application Serial No. 97148160, Apr. 12, 2012, Taiwan.

(Continued)

*Primary Examiner* — Vernal Brown

(57) ABSTRACT

Radio-frequency identification (RFID) tag antenna, tags and communications systems using the same are presented. The RFID tag antenna includes a patterned conductive loop having a plurality of longitudinal conductive sections and a pair of transverse conductive sections connecting to each end of the longitudinal conductive sections to serve as a matching network. A pair of extended conductive arms is electrically connected to the patterned conductive loop via two nodes. A bonding pad with an RFID chip disposed thereon is arranged at the central area of the pair of extended conductive arms.

16 Claims, 3 Drawing Sheets

U.S. PATENT DOCUMENTS

| | | | |
|---|---|---|---|
| 2001/0048361 A1* | 12/2001 | Mays et al. | 340/10.51 |
| 2006/0208900 A1* | 9/2006 | Tavassoli Hozouri | 340/572.7 |
| 2007/0040028 A1 | 2/2007 | Kawamata | |
| 2007/0200705 A1 | 8/2007 | Yamagajo et al. | |
| 2007/0200711 A1* | 8/2007 | Kai et al. | 340/572.7 |
| 2007/0252770 A1 | 11/2007 | Kai et al. | |

OTHER PUBLICATIONS

China Patent Office, Office Action, Patent Application Serial No. 200910004122.7, May 2, 2012, China.

* cited by examiner

US 8,319,610 B2

RADIO-FREQUENCY IDENTIFICATION (RFID) ANTENNA, TAGS AND COMMUNICATIONS SYSTEMS USING THE SAME

CROSS REFERENCE TO RELATED APPLICATIONS

This application is based upon and claims the benefit of priority from a prior U.S. Provisional Application No. 61/088,083, filed on Aug. 12, 2008, the entire contents of which are incorporated herein by reference.

This application is based upon and claims the benefit of priority from a prior Taiwanese Patent Application No. 097148160, filed on Dec. 11, 2008, the entire contents of which are incorporated herein by reference.

BACKGROUND

1. Technical Field

The disclosure relates to radio-frequency identification tag devices, and in particular, to radio-frequency identification (RFID) tag antennas, tags and communications systems using the same.

2. Description of the Related Art

Radio-frequency identification (RFID) systems have been applied in many fields such as in supply chain management, security, tracking and other commercial applications. Thus, RFID innovative developments have been driven by users wanting to improve upon the technology, such as in the supply chain management process. The RFID systems allow transparency throughout the distribution chain including manufacturers, suppliers, distributors and retailers, providing information such as product type, location, date, etc. One of the greatest benefit of RFID systems is to improve upon supply chain management efficiency, as an example. At present, most product information is recorded in barcodes, and the information is then retrieved by scanning the barcode using a scanner. Meanwhile, the RFID tag antennas can be detected within a certain range, and a large amount of information can be processed simultaneously.

However, the shortcomings of the design and application of conventional RFID tag antennas are that the fabrication costs thereof are expensive. At present, costs for RFID tag antennas take the largest proportion among costs of RFID devices. Recently, process improvements have been made to lower fabrication costs of the RFID tag antenna. For example, RFID tag antenna conductors can be made of silver paste using the roll-to-roll manufacturing process or screen printing process or other printing methods to reduce fabrication costs. In the fabricating process however, the amount of silver paste required is a key portion of the total fabrication material cost of the RFID tag antenna.

U.S. Pat. No. 7,277,017, the entirety of which is hereby incorporated by reference, discloses an RFID tag antenna, implemented by a dipole antenna (dipole) tag antenna or a Central Loop (loop) consisting of a conductor.

FIG. 1 is a schematic plan view illustrating a conventional RFID tag antenna. Referring to FIG. 1, in the conventional RFID tag antenna 10, an antenna pattern 12 is formed on the substrate 11. An IC chip 13 is disposed on the antenna pattern 12. The antenna pattern 12 can serve as a dipole antenna which includes two singular pole patterns 121 and 122. Each of the two singular pole patterns 121 and 122 extends outwardly from the position of the IC chip 13. The antenna pattern 12 further includes a correction loop 123 to compensate or adapt to antenna characteristics. The correction loop 123 bypasses the position of the IC chip 13 and connects to the two singular pole patterns 121 and 122.

FIG. 2 is a schematic plan view illustrating another conventional RFID tag antenna. Referring to FIG. 2, in the conventional RFID tag antenna 10, an antenna pattern 12 is formed on the substrate 11. An IC chip 13 is disposed on the antenna pattern 12 which includes a loop antenna. Two extension portions 12a and 12b extend outwardly from the position of the IC chip 13. The two extension portions 12a and 12b are respectively connected to the IC chip 13 and a correction loop 123. The IC chip 13 is further connected to a conductive pattern 16. Both sides of the correction loop 123 respectively include dual patterns 123a and 123b which purpose to remove the parasitic capacitance between the IC chip 13 and the antenna pattern 12.

However, the inductance generated by the loop antenna does not effectively eliminate the capacitance generated between the conductor and the IC chip. Furthermore, controlling RFID tag antenna resonance frequencies for conventional RFID tag antennas is difficult.

BRIEF SUMMARY

An exemplary embodiment of the disclosure provides a radio-frequency identification (RFID) tag antenna, comprising: a patterned conductive loop having a plurality of longitudinal conductive sections and a plurality of transverse conductive sections connecting to each end of the longitudinal conductive sections to serve as a matching network; a pair of extended conductive arms electrically connected to the patterned conductive loop via two nodes; and a bonding pad with an RFID chip disposed thereon arranged at the central area of the pair of extended conductive arms.

Another exemplary embodiment of the disclosure provides a radio-frequency identification (RFID) tag device, comprising: a substrate; a patterned conductive loop disposed on the substrate, the patterned conductive loop having a plurality of longitudinal conductive sections and a plurality of transverse conductive sections connecting to each end of the longitudinal conductive sections to serve as a matching network; a pair of extended conductive arms electrically connected to the patterned conductive loop via two nodes; and a bonding pad with an RFID chip disposed thereon arranged at the central area of the pair of extended conductive arms.

Another exemplary embodiment of the disclosure provides a radio-frequency identification (RFID) communications system, comprising: an RFID tag device; a read antenna sensing the RFID tag device; and a microprocessor processing and transmitting a signal sensed by the read antenna. The RFID tag device comprises: a substrate; a patterned conductive loop disposed on the substrate, the patterned conductive loop having a plurality of longitudinal conductive sections and a pair of transverse conductive sections connecting to each end of the longitudinal conductive sections to serve as a matching network; a pair of extended conductive arms electrically connected to the patterned conductive loop via two nodes; and a bonding pad with an RFID chip disposed thereon arranged at the central area of the pair of extended conductive arms.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
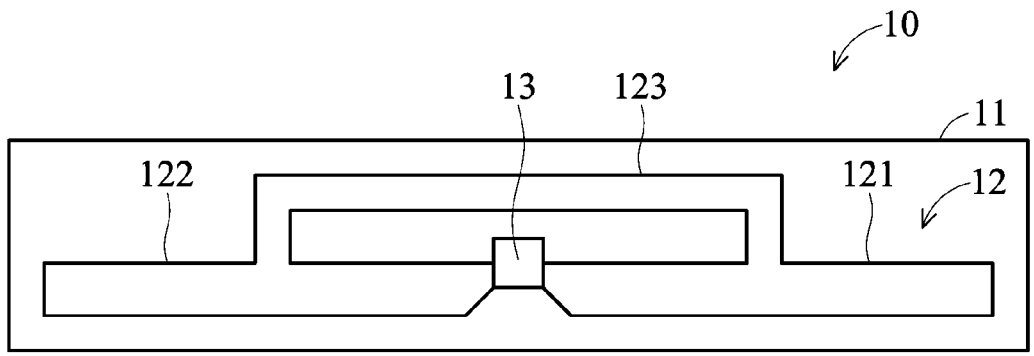
FIG. 1 is a schematic plan view illustrating a conventional RFID tag antenna.
Figure 2:
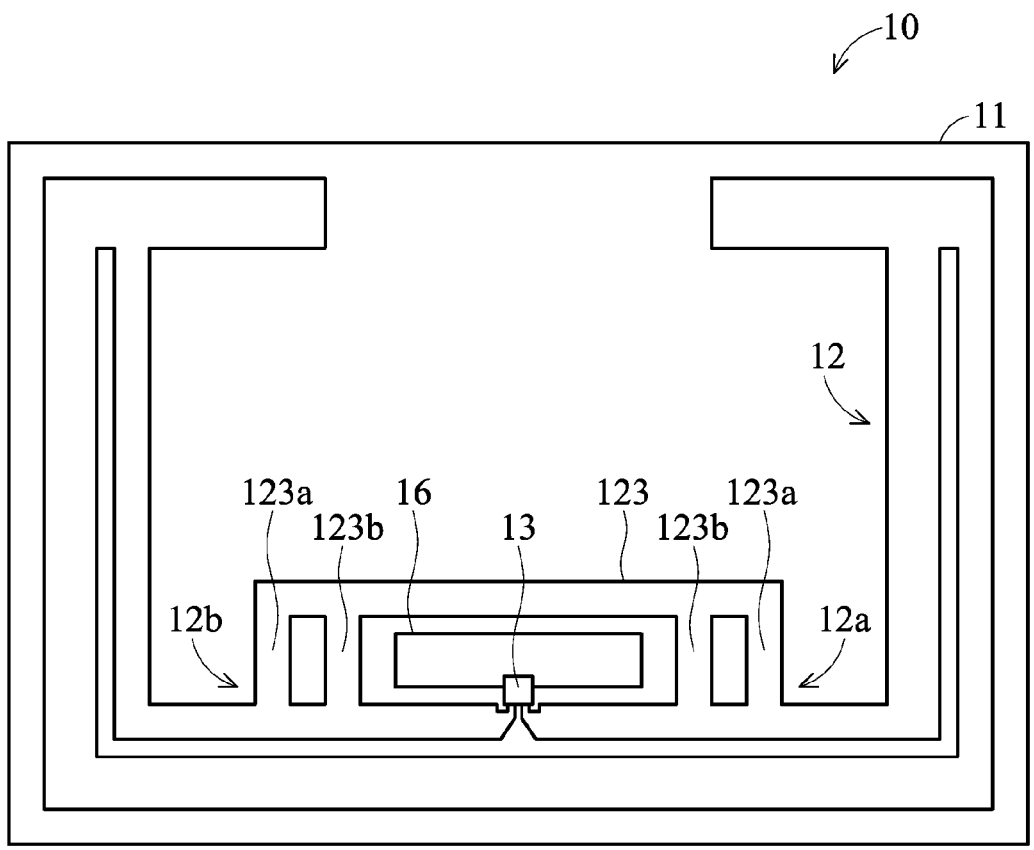
FIG. 2 is a schematic plan view illustrating another conventional RFID tag antenna.

It is to be understood that the following disclosure provides many different exemplary embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation method for a first feature over or on a second feature in the description that follows may include embodiments in which the first and second features are formed in direct contact or not in direct contact.

Main features and key aspects of exemplary embodiments of the disclosure provide a radio-frequency identification (RFID) tag antenna, tag devices and communications systems. Since the cost of an RFID tag device is mainly dependent on the antenna design, there is a need to reduce production costs of the antenna. In addition, the conductor materials based on the antenna design includes aluminum, etched copper, silver paste formed by screen printing, combined with roll-to-roll manufacturing processes. In one exemplary embodiment, the gain of the RFID tag antenna can reach at least 1.42 dBi. Furthermore, the RFID tag antenna includes a special impedance matching network which can adjust location of the impedance matching network, thereby facilely controlling the antenna resonance frequency.

Figure 3:
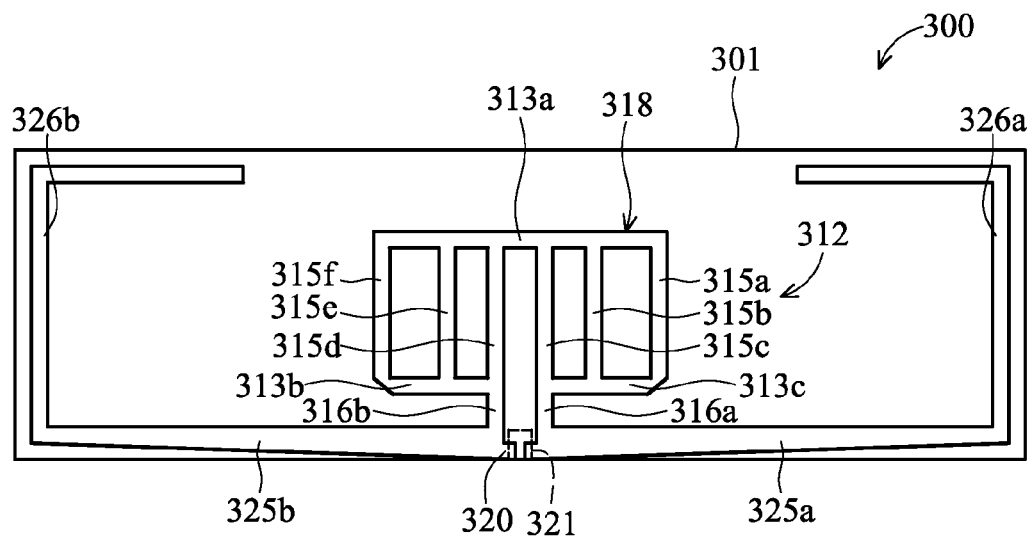
FIG. 3 is a schematic plan view of an exemplary embodiment of an RFID tag antenna of the disclosure.

FIG. 3 is a schematic plan view of an embodiment of an RFID tag antenna of the disclosure. Referring to FIG. 3, an RFID tag device 300 includes a substrate 301 and an antenna pattern 312 formed on the substrate 301. The substrate 301 includes a rigid substrate, a flexible substrate, a paper, a fabric, composites thereof, or combinations thereof. For example, the substrate can be made of a glass fiber material (FR4), or polyethylene terephthalate (PET), polyimide (PI), or other soft or hard polymer substrates. According to another exemplary embodiment of the disclosure, the substrate comprises a high permittivity material or a high permeability material. The antenna pattern 312 is not limited to being formed on the substrate 301. It can be alternatively or selectively embedded in the substrate 301.

The antenna pattern 312 includes a patterned conductive loop 318 disposed on the substrate 301. The patterned conductive loop 318 includes a plurality of longitudinal conductive sections 315a-315f and a plurality of transverse conductive sections 313a, 313b and 313c connecting to each end of the longitudinal conductive sections to serve as a matching network. Note that the width and spacing of each longitudinal conductive sections 315a-315f are dependent on realistic design requirements of the antenna characteristics. A pair of extended conductive arms 325a and 325b are disposed on the substrate to serve as a dipole antenna and are electrically connected to the patterned conductive loop 318 via two nodes 316a and 316b. The pair of extended conductive arms 325a and 325b can be a pair of tapered dipole antennas which width becomes thinner outwardly from the central area. According to another exemplary embodiment of the disclosure, the antenna pattern 312 further includes a pair of second conductive segments 326a and 326b respectively connected to a thinner end of the pair of tapered dipole antennas 325a and 325b, wherein the pair of second conductive segments are substantially perpendicular to the pair of tapered dipole antennas or are extended along any included angle, and wherein a length and a width of the pair of second conductive segments are dependent upon the impedance and frequency response of the RFID chip. A bonding pad 320 with an RFID chip 321 disposed thereon is arranged at the central area between the pair of extended conductive arms 325a and 325b.

In order to comply with internal impedance matching of radio-frequency identification (RFID) chips, some embodiments of the disclosure derive various antenna impedance matching networks with two nodes electrically connected to the pair of tapered dipole antennas to optimize impedance matching of the antenna and to achieve excellent resonance effect.

Note that the RFID tag antenna pattern 312 may be adopted by any different conductor materials, such as copper, copper paste, silver paste, aluminum and the likes, achieving frequency response of 902~928 MHz and bandwidth of 50 MHz, or alternatively achieving frequency response of 860~960 MHz.

Figure 4:
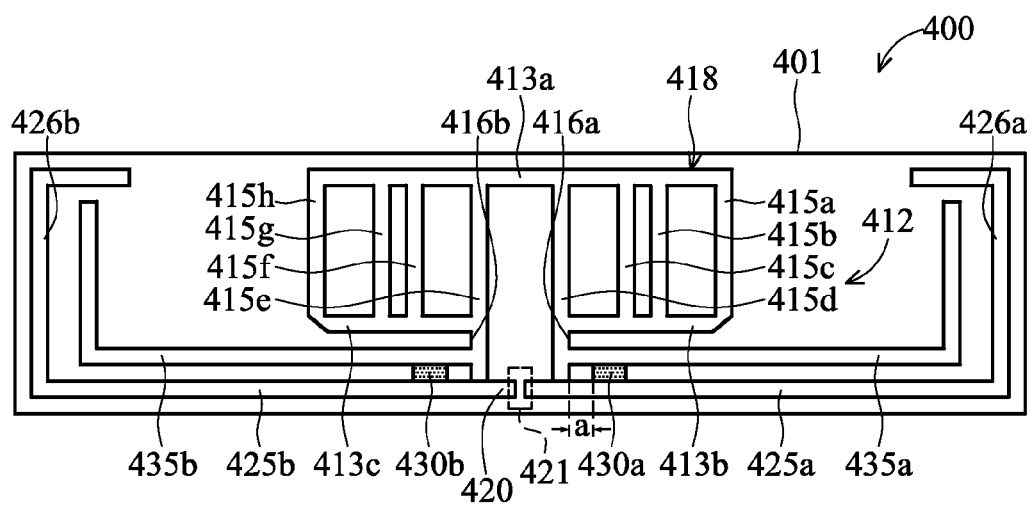
FIG. 4 is a schematic plan view of another exemplary embodiment of the RFID tag antenna of the disclosure.

FIG. 4 is a schematic plan view of another exemplary embodiment of the RFID tag antenna of the disclosure. Referring to FIG. 4, an RFID tag device 400 includes a substrate 401 and an antenna pattern 412 formed on the substrate 401. The substrate 401 includes a rigid substrate, a flexible substrate, a paper, a fabric, composites thereof, or combinations thereof. For example, the substrate can be made of a glass fiber material (FR4), or polyethylene terephthalate (PET), polyimide (PI), or other soft or hard polymer substrates. According to another exemplary embodiment of the disclosure, the substrate comprises a high-permittivity material or a high permeability material. The antenna pattern 412 is not limited to being formed on the substrate 401. It can be alternatively or selectively embedded in the substrate 401.

The antenna pattern 412 includes a patterned conductive loop 418 disposed on the substrate 401. The patterned conductive loop 418 includes a plurality of longitudinal conductive sections 415a-415h and a plurality of transverse conductive sections 413a, 413b, and 413c connecting to each end of the longitudinal conductive sections to serve as a matching network. Note that the width and spacing of each longitudinal conductive sections 415a-415h are dependent on realistic design requirements of antenna characteristics. A pair of extended conductive arms are disposed on the substrate to serve as a dipole antenna and are electrically connected to the patterned conductive loop 418 via two nodes 416a and 416b. The pair of extended conductive arms can be a pair of parallel dipole antennas 425a, 435a, and 425b, 435b. Each parallel dipole antenna is separated with a predetermined spacing. The pair of parallel dipole antennas 425a, 435a, and 425b, 435b respectively has a node 430a, 430b connected therebetween, wherein a distance a between the node and the center of the pair of parallel dipole antennas is dependent upon the impedance and frequency response of the RFID chip. According to another exemplary embodiment of the disclosure, the antenna pattern 412 further includes a pair of second conductive segments 426a and 426b respectively connected to an end of the pair of dipole antennas 425a and 425b, wherein the pair of second conductive segments are substantially perpendicular to the pair of tapered dipole antennas or are extended along any included angle, and wherein a length and a width of the pair of second conductive segments are dependent upon the impedance and frequency response of the RFID chip. A bonding pad 420 with an RFID chip 421 disposed thereon is arranged at the central area between the pair of extended conductive arms 425a and 425b.

Figure 5:
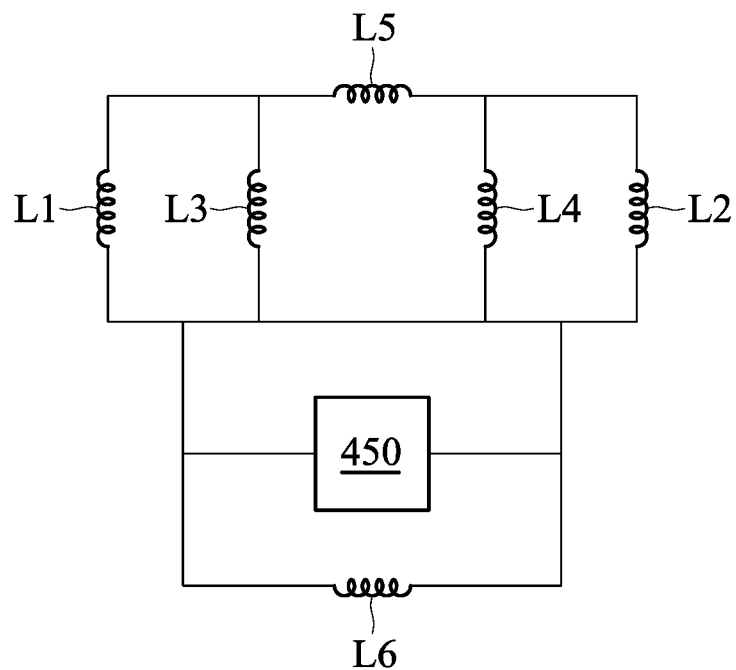
FIG. 5 is a schematic equivalent circuit diagram illustrating an exemplary embodiment of the RFID tag antenna.

FIG. 5 is a schematic equivalent circuit diagram illustrating an exemplary embodiment of the RFID tag antenna. In FIG. 5, each longitudinal conductive section of the conductive loop can be several stripes of perpendicular metal conductive materials. The length of the inductor and the number of the vertical conductors can be adjusted. The inductors indicated as L1, L2, L3, L4, and the inter-inductance L5 between the inductors, and the inductance L6 of the antenna are composed of common impedance. The common impedance and the impedance of the RFID chip 450 results in conjugate impedance matching, thereby increasing antenna resonance response and antenna transmission efficiency.

Figure 6:
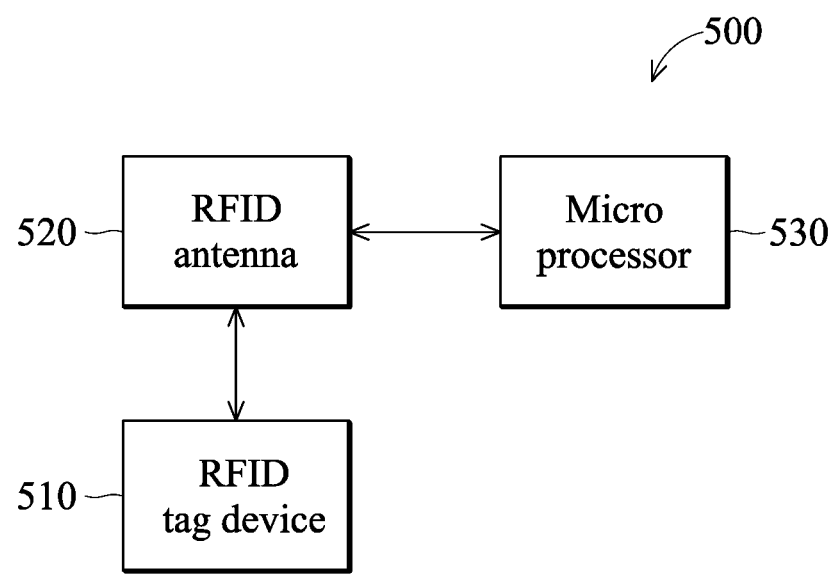
FIG. 6 is a schematic block diagram illustrating an exemplary embodiment of a radio-frequency identification (RFID) communications system.

FIG. 6 is a schematic block diagram illustrating an exemplary embodiment of the radio-frequency identification (RFID) communications system. Referring to FIG. 6, a radio-frequency identification (RFID) tag communications system 500, including an RFID tag device 510, an antenna 520 for reading the RFID tag device, and a microprocessor 530 processing and transmitting the signal read by the sensing antennas. The above-mentioned radio-frequency identification (RFID) tag communications system 500 has many applications such as supply chain management, access control card, and warehouse management system on a UHF waveband. Moreover, in the Gen2 specification, there are dual mode sensing functions, wherein a dual sensing mode is generated for both the far end and the close end of passive RFIDs. Advantages of various embodiments of the RFID antenna, tags and communications systems using the same of the disclosure are as follows. First, antenna performance is maintained. Also, the cost of the tag antenna is reduced. Next, adaptability of the antenna is improved. Specifically, a special adaptive matching network is designed and an adaptive adjusting RFID device is applicable for UHF central frequencies, i.e., matching the multiple impedances of the RFID device. Thus, conjugate matching and maximum energy transmission is achieved.

While the disclosure has been described by way of example and in terms of the exemplary embodiments, it is to be understood that the disclosed embodiments are not limitative. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A radio-frequency identification (RFID) tag antenna, comprising:
   a patterned conductive loop having a plurality of longitudinal conductive sections and a plurality of transverse conductive sections connecting to each end of the longitudinal conductive sections to serve as a matching network;
   a pair of extended conductive arms electrically connected to the patterned conductive loop via two nodes, wherein the pair of extended conductive arms is a pair of tapered dipole antennas which width becomes thinner outwardly;
   a bonding pad with an RFID chip disposed thereon, arranged at the central area between the pair of extended conductive arms; and
   a pair of second conductive segments respectively connected to a thinner end of the pair of tapered dipole antennas, wherein the pair of second conductive segments are substantially perpendicular to the pair of tapered dipole antennas or are extended along any included angle, and wherein a length and a width of the pair of second conductive segments are dependent upon the impedance and frequency response of the RFID chip.

2. The RFID antenna as claimed in claim 1, wherein the pair of extended conductive arms is a pair of parallel dipole antennas with a predetermined spacing therebetween.

3. The RFID antenna as claimed in claim 2, wherein the pair of parallel dipole antennas has a node connected therebetween, and wherein a distance between the node and the center of the pair of parallel dipole antennas is dependent upon the impedance and frequency response of the RFID chip.

4. The RFID antenna as claimed in claim 1, wherein the patterned conductive loop comprises electroplated copper, electroplated aluminum, silver paste, or copper paste.

5. The RFID antenna as claimed in claim 1, wherein the patterned conductive loop comprises etched copper or etched aluminum.

6. A radio-frequency identification (RFID) tag device, comprising:
   a substrate;
   a patterned conductive loop disposed on the substrate, wherein the patterned conductive loop has a plurality of longitudinal conductive sections and a plurality of transverse conductive sections connecting to each end of the longitudinal conductive sections to serve as a matching network;
   a pair of extended conductive arms electrically connected to the patterned conductive loop via two nodes, wherein the pair of extended conductive arms is a pair of tapered dipole antennas which width becomes thinner outwardly;
   a bonding pad with an RFID chip disposed thereon, arranged at the central area of the pair of extended conductive arms; and
   a pair of second conductive segments respectively connected to a thinner end of the pair of tapered dipole antennas, wherein the pair of second conductive segments is substantially perpendicular to the pair of tapered dipole antennas or are extended along any included angle, and wherein a length and a width of the pair of second conductive segments are dependent upon the impedance and frequency response of the RFID chip.

7. The RFID tag device as claimed in claim 6, wherein the substrate comprises a rigid substrate, a flexible substrate, a paper, a fabric, or combinations thereof.

8. The RFID tag device as claimed in claim 6, wherein the substrate comprises a high permittivity material or a high permeability material.

9. The RFID tag device as claimed in claim 6, wherein the patterned conductive loop is embedded in the substrate.

10. The RFID tag device as claimed in claim 6, wherein the pair of extended conductive arms is a pair of parallel dipole antennas with a predetermined spacing therebetween.

11. The RFID tag device as claimed in claim 10, wherein the pair of parallel dipole antennas has a node connected therebetween, and wherein a distance between the node and the center of the pair of parallel dipole antennas is dependent upon the impedance and frequency response of the RFID chip.

12. The RFID tag device as claimed in claim 6, wherein the patterned conductive loop comprises electroplated copper, electroplated aluminum, silver paste, or copper paste.

13. The RFID tag device as claimed in claim 6, wherein the patterned conductive loop comprises etched copper or etched aluminum.

14. A radio-frequency identification (RFID) communications system, comprising:
   an RFID tag device, comprising:
   a substrate;
   a patterned conductive loop disposed on the substrate, wherein the patterned conductive loop has a plurality of longitudinal conductive sections and a plurality of transverse conductive sections connecting to each end of the longitudinal conductive sections to serve as a matching network;
   a pair of extended conductive arms electrically connected to the patterned conductive loop via two nodes, wherein the pair of extended conductive arms is a pair of tapered dipole antennas which width becomes thinner outwardly;
   a pair of second conductive segments respectively connected to a thinner end of the pair of tapered dipole antennas, wherein the pair of second conductive segments are substantially perpendicular to the pair of tapered dipole antennas or are extended along any included angle, and wherein a length and a width of the pair of second conductive segments are dependent upon the impedance and frequency response of the RFID chip;
   a bonding pad with an RFID chip disposed thereon arranged at the central area between the pair of extended conductive arms;
   a read antenna sensing the RFID tag device; and
   a microprocessor processing and transmitting a signal sensed by the read antenna.

15. The RFID communications system as claimed in claim 14, wherein the pair of extended conductive arms is a pair of parallel dipole antennas with a predetermined interval therebetween.

16. The RFID communications system as claimed in claim 15, wherein the pair of parallel dipole antennas has a node connected therebetween, and wherein a distance between the node and the center of the pair of parallel dipole antennas is dependent upon the impedance and frequency response of the RFID chip.

* * * * *